United States Patent [19]

Seibert et al.

[11] Patent Number: 4,611,117
[45] Date of Patent: Sep. 9, 1986

[54] METHOD AND ARRANGEMENT FOR THE AUTOMATIC STABILIZATION OF A SCINTILLATION DETECTOR

[75] Inventors: Frank Seibert, Rheinfelden; Gustav Wetzel, Lörrach, both of Fed. Rep. of Germany

[73] Assignee: Endress u. Hauser GmbH u. Co., Fed. Rep. of Germany

[21] Appl. No.: 636,816

[22] Filed: Aug. 1, 1984

[30] Foreign Application Priority Data

Aug. 4, 1983 [DE] Fed. Rep. of Germany ....... 3328256

[51] Int. Cl.$^4$ .............................................. G01T 1/20
[52] U.S. Cl. .................. 250/252.1; 250/369
[58] Field of Search .............. 250/252.1, 369, 207, 250/361 R

[56] References Cited

U.S. PATENT DOCUMENTS 3,179,801  4/1965  Scherbatskoy ............ 250/252.1
3,428,804  2/1969  Comunnetti ............... 250/252.1

FOREIGN PATENT DOCUMENTS 0066763  12/1982  European Pat. Off. .
1238112   4/1967  Fed. Rep. of Germany .
2152115   4/1973  Fed. Rep. of Germany .

OTHER PUBLICATIONS

K. G. A. Porges, "The Performance of a Light-Pulser-Operated Digital Stabilizer", Nuclear Instruments and Methods, 124, (1975), pp. 235-241.

R. Martincic, V. Ivkovic and M. Tiringer, "A System for Stabilizing the Gain of a Scintillation Spectrometer Using a Light-Emitting Diode and a Processor in Feedback", Nuclear Instruments and Methods, 147, (1977), pp. 513-518.

*Primary Examiner*—Carolyn E. Fields
*Attorney, Agent, or Firm*—Barnes & Thornburg

[57] ABSTRACT

A plastic scintillation detector (14) generates on the basis of ionizing radiation coming from a radiation source (16) light flashes which are converted by a photoelectric transducer (20), for example a photoelectron multiplier, to electrical output pulses. An evaluation circuit (22) counts the output pulses as a measure of the radiation intensity. For automatic stabilization of the scintillation detector a light source (24) is controlled by a driving circuit (26) in such a manner that it transmits light pulses whose intensity is modulated in accordance with a predetermined periodic function, for example a sawtooth function. The modulated light pulses are also intercepted by the photoelectric transducer (20) and converted by the latter into electrical reference pulses. A monitoring circuit (28) determines in each modulation period the number of reference pulses whose amplitude exceeds a predetermined reference threshold value lying in the modulation interval. The pulse number determined is used to stabilize the scintillation detector, either by controlling the amplification in the sense of maintaining a predetermined pulse number or by corresponding correction of the measurement result furnished by the evaluation circuit.

27 Claims, 8 Drawing Figures

METHOD AND ARRANGEMENT FOR THE AUTOMATIC STABILIZATION OF A SCINTILLATION DETECTOR

The invention relates to a method for the automatic stabilisation of a scintillation detector, in particular a plastic scintillation detector, with the aid of a pulsewise operated light source whose light pulses are intercepted by the photoelectric transducer of the scintillation detector, and a monitoring circuit which responds to the output signals of the photoelectric transducer (reference pulses) generated by the light pulses, and an arrangement for carrying out the method.

In a method known from EP-OS No. 0 066 763 the pulsewise operated source formed by a light-emitting diode is controlled in such a manner that it emits light pulses of constant intensity. These light pulses are incident after reflection and diffusion at a glass disk covering the scintillation crystal on the photoelectron multiplier which forms the photoelectric transducer of the scintillation detector. The monitoring circuit contains a peak detector which determines the peak value of each reference pulse. The peak value determined is compared in an amplifying control circuit with a desired value and the amplifying control circuit regulates the amplification of the photoelectron multiplier by acting on one or more of its voltage divider resistors in such a manner that the peak values of the reference pulses are kept at the desired value. In this manner the amplification of the photoelectron multiplier is kept continuously at a constant value. The monitoring and control of the amplification is completely by analog technique.

The problem underlying the invention is to provide a method in which the evaluation of the reference pulses necessary for the stabilization is carried out digitally and which is therefore particularly suitable for use in digitally operating scintillation counters.

According to the invention this problem is solved in that the intensity of the light pulses is modulated in accordance with a predetermined periodic function and that in each modulation period the number of the reference pulses whose amplitude exceeds a predetermined reference threshold value lying in the modulation interval is determined and used for the stabilization.

In the method according to the invention the evaluation of the reference pulses for the stabilization is by simple counting of the pulses exceeding the reference threshold value. The monitoring circuit thus has substantially the same construction as the digital evaluation circuit which is usually employed in scintillation counters and in which the scintillation pulses exceeding a predetermined threshold value are counted. These circuit can therefore be formed using conventional integrated digital circuits.

The pulse number obtained by counting the reference pulses in each modulation period can be used for automatic amplification control. A particular advantage of the method according to the invention resides in that the pulse number obtained can be used directly for the correction of the digital measurement result furnished by the evaluation circuit without a compensation being necessary of the influences which have led to a change of the pulse rate. This possibility is available in particular when evaluation of the digital measurement result is by a microcomputer.

Advantageous further improvements of the method according to the invention and a preferred arrangement for carrying out the method are characterized in the subsidiary claims.

Further features and advantages of the invention will be apparent from the following description of examples of embodiment with the aid of the drawings, wherein.

Figure 1:
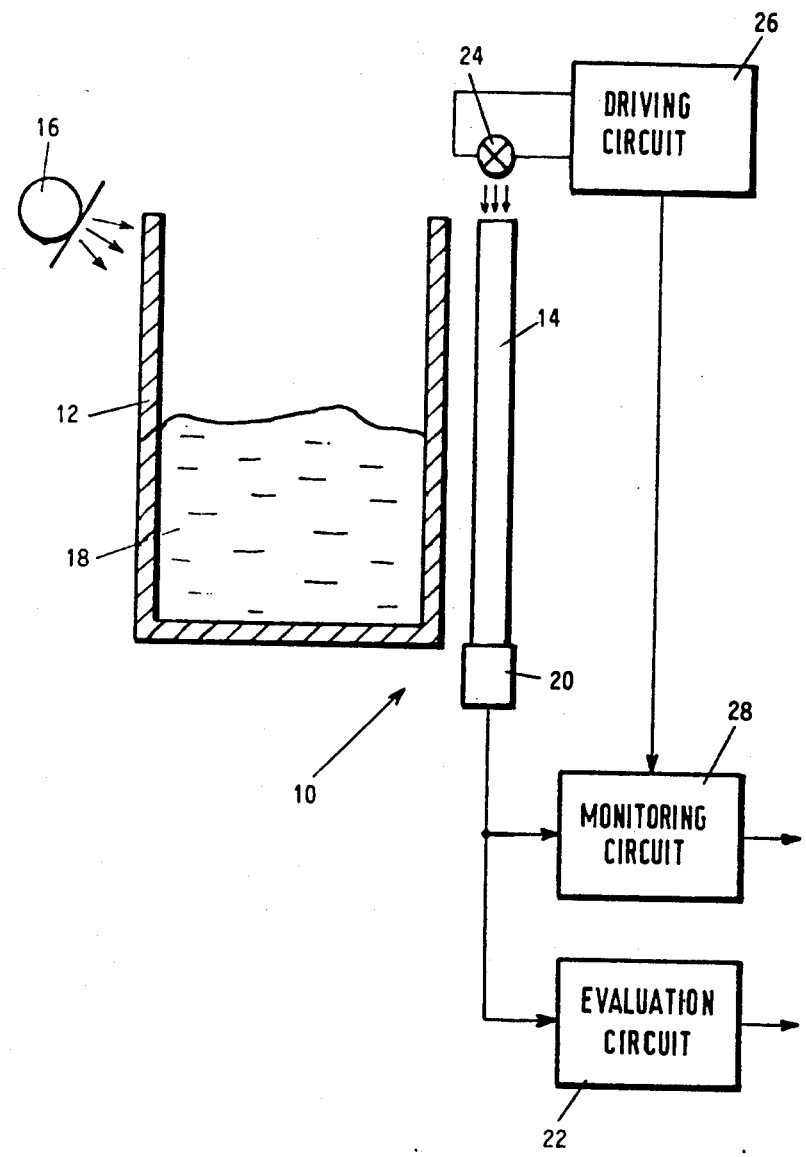
FIG. 1 is a schematic view of an arrangement for measuring the filling level in a container with the aid of a plastic scintillation detector.

FIG. 1 shows as example of use for a plastic scintillation detector 10 the measurement of the filling level in a container 12. On the one side of the container 12 a plastic scintillator 14 is disposed which extends over the entire height of the filling level to be monitored. On the opposite side of the container 12 a gamma radiation source 16 is disposed whose radiation is directed through the container 12 and the material 18 therein into the plastic scintillator 14. The gamma radiation is absorbed to a greater extent by the filling material 18 than by the air above the material and consequently the intensity of the gamma radiation incident on the plastic scinillator 14 depends on the filling level in the container. As a result, the number and the intensity of the light flashes produced in the plastic scintillator 14 by the gamma radiation is also dependent on the filling level in the container 12.

To detect and evaluate the light flashes generated in the plastic scintillator in usual manner at one end of the plastic scintillator a photoelectric transducer 20 is disposed, generally a photoelectron multiplier, which converts each incident light flash to an electric pulse. The output of the photoelectron multiplier 20 is connected to an electronic evaluation circuit 22 in which the electronical pulses whose amplitude exceeds a predetermined discriminator threshold are counted. The count result is utilized to display the filling level in the container 12.

Stabilization and automatic monitoring of the plastic scintillation detector are necessary to detect and compensate influences which impair the measurement. By changes in the plastic scintillator (clouding, reduction of the light yield) and a decrease in the amplification of the photoelectron multiplier in the course of time there is a continous increase in the number of pulses which fall below the discriminator threshold so that they are no longer counted in the counter of the evaluation circuit. In the plastic scintillation detector of FIG. 1 steps are taken for compensating these phenomena and thereby stabilizing the operation of the plastic scintillator.

For this purpose, at the end of the plastic scintillator 14 opposite the photoelectron multiplier 20 a reference light source 24 is disposed which is controlled by a driving circuit 26 in such a manner that it transmits brief reference light pulses which pass through the plastic scintillator and are incident on the photoelectron multiplier 20. Apart from the evaluation circuit 22 a monitoring circuit 28 is connected to the output of the photoelectron multiplier 20 and is so constructed that it responds to the output pulses of the photoelectron multiplier 20 which originate from the light pulses of the light source 24 but not to the output pulses which originate from the scintillation light flashes generated by the gamma radiation.

Figure 2:
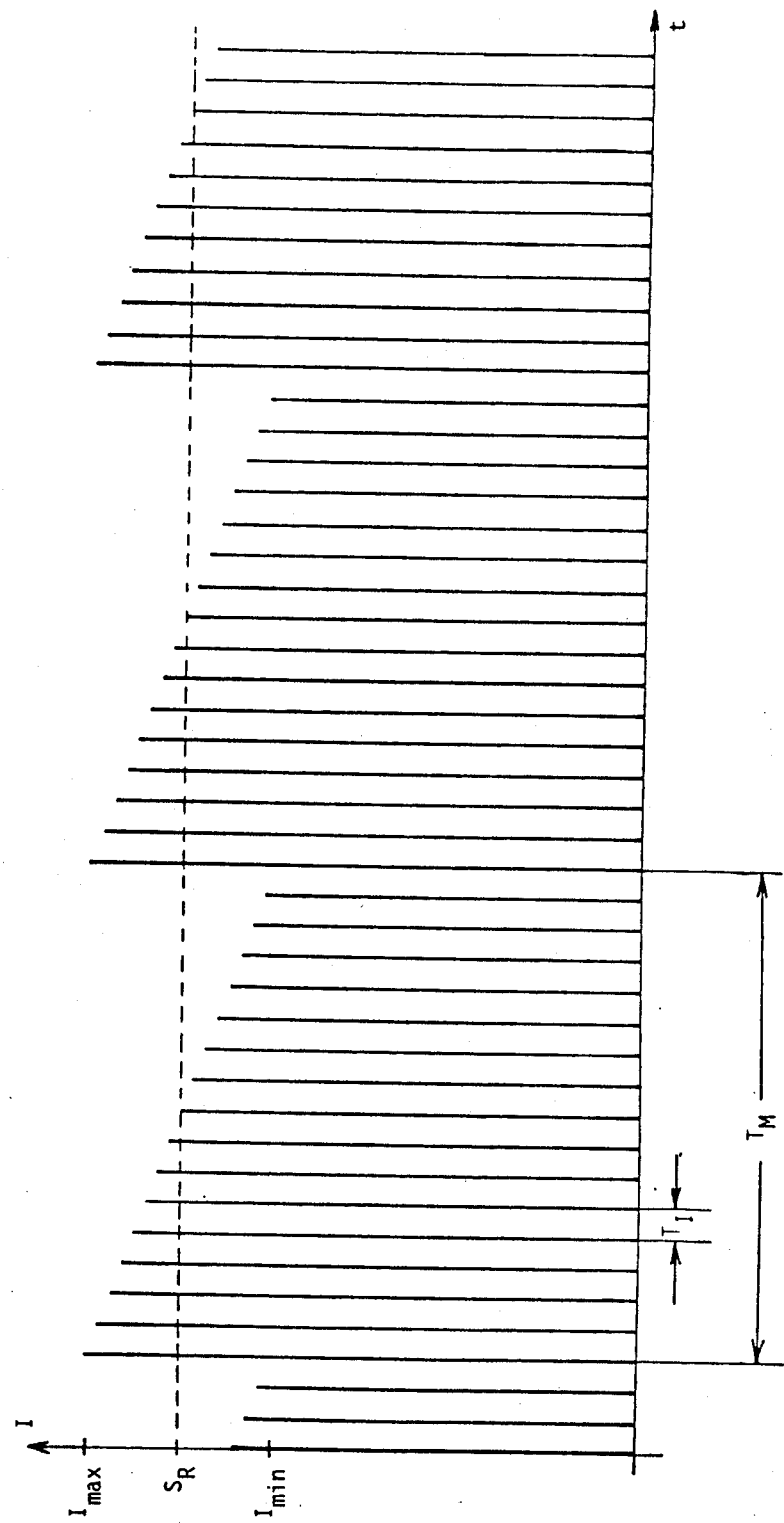
FIG. 2 is the time diagram of pulses employed in the arrangement of FIG. 1.

The particular feature of the stabilizing arrangement illustrated in FIG. 1 is that the intensity of the light pulses emitted by the light source 24 is not constant but is periodically modulated by the driving circuit 26 in dependence upon the time. FIG. 2 shows the intensity I of the light pulses as a function of the time t for the preferred case where the modulation is in accordance with a sawtooth function with the modulation period $T_M$. The modulation period $T_M$ is large compared with the recurrence period $T_I$ of the light pulses so that in each modulation period $T_M$ a large number of light pulses is contained. In the example of the embodiment of the drive circuit 26 described below the modulation period $T_M$ is 16 s and the light pulses are emitted with a recurrence frequency of 32 Hz so that the recurrence period $T_I$ is 31.25 ms. In each modulation period $T_M$ there are thus 512 light pulses. The duration of each light pulse is in turn very short compared with the recurrence period $T_I$: it is for example 200 ns.

In each modulation period $T_M$ the intensity of the light pulses decreases linearly from a maximum value $I_{max}$ to a minimum value $I_{min}$ and at the start of the next period again jumps to the maximum value $I_{max}$. Between the two limit values $I_{max}$ and $I_{min}$ lies the modulation interval.

The reference light source 24 is preferably a light-emitting diode because the latter is particularly well suited to the emission of short amplitude-modulated light pulses. This will be assumed in the following description.

The electrical output pulses of the photoelectron multiplier 20 originating from the reference light pulses are proportional to the light pulses so that the diagram of FIG. 2 also represents the time variation of these output pulses, which are called reference pulses.

Figure 3:
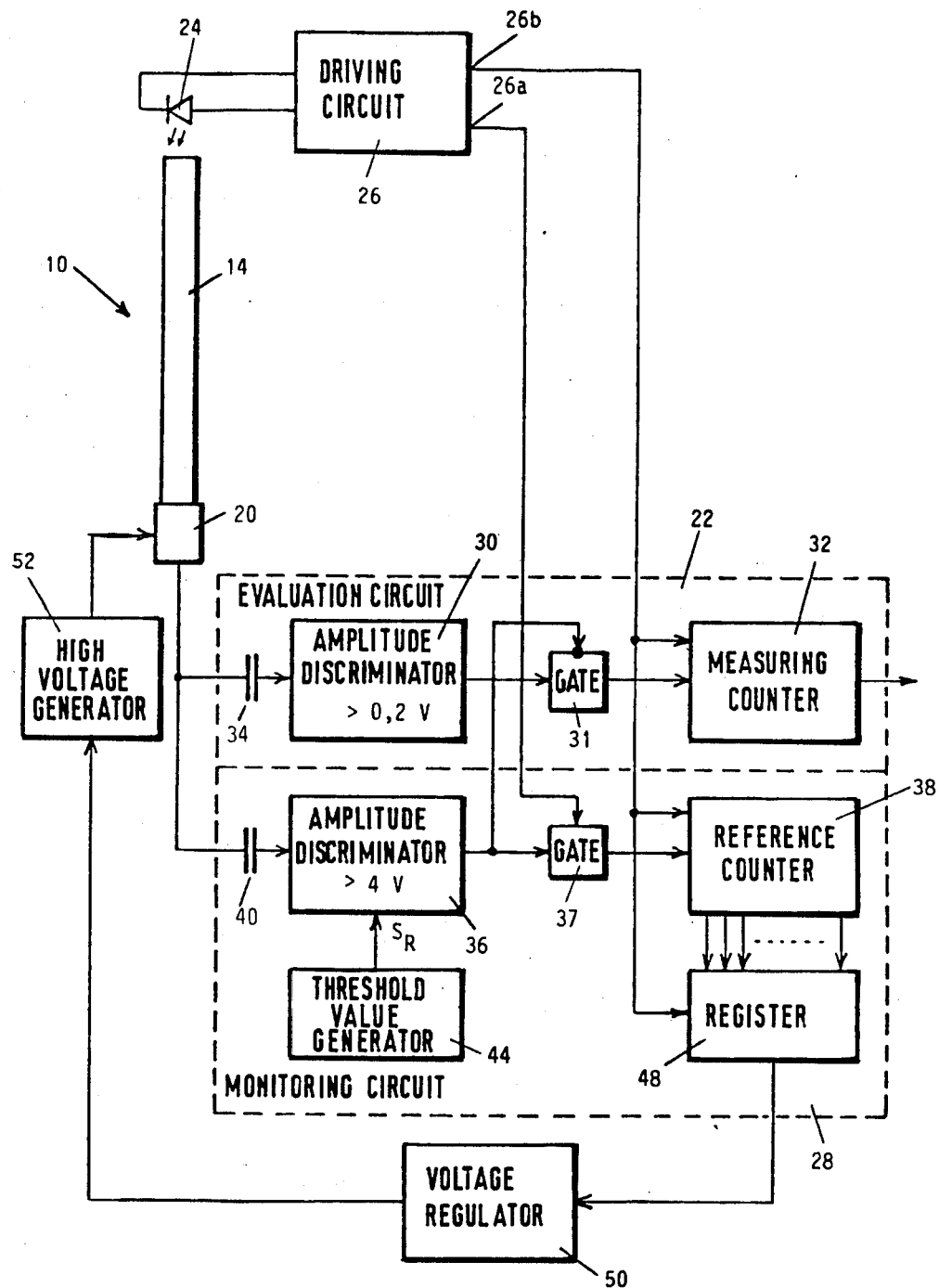
FIG. 3 shows the block circuit diagram of a first embodiment of the evaluation circuit and the monitoring circuit of the FIG. 1 in greater detail.

FIG. 3 shows an example of embodiment of the monitoring circuit 28 which permits the evaluation of the light pulses illustrated in FIG. 2 for the purpose of stabilizing the plastic scintillator detector.

FIG. 3 again shows the plastic scintillation detector 10 with the plastic scintillator 14 and the photoelectron multiplier 20 as well as the pulsewise operated light-emitting diode 24 and its driving circuit 26 of FIG. 1. The makeup of the evaluation circuit 22 is shown in greater detail. It contains an amplitude discriminator 30 and a measuring counter 32. The input of the amplitude discriminator 30 is connected via an isolating capacitor 34, which keeps away undesirable dc voltage components, to the output of the photoelectron multiplier 20. Of the output pulses of the photoelectron multiplier 20 the amplitude discriminator allows to pass only those which exceed a predetermined threshold value of for example 0.2 V. The output of the amplitude discriminator 30 is connected via a gate circuit 31 to the counting input of the measuring counter 32 so that the latter counts all the output pulses of the photoelectron multiplier 20 whose amplitude is greater than 0.2 V. Since the pulses originating from the scintillation light flashes have a very short duration of the order of magnitude of about 10 ns, for the measuring counter 32 a highspeed counter must be used which responds to such short pulses. Suitable is for example a TTL counter.

The plastic scintillation detector 10 forms in conjunction with the evaluation circuit 22 a scintillation counter of conventional type whose measurement result represented by the count of the counter 32 reached in a predetermined unit of time can be utilized in the usual manner.

The monitoring circuit 28 contains in similar manner an amplitude discriminator 36 and a reference counter 38. The input of the amplitude discriminator 36 is connected via an isolating capacitor 40, which keeps away undesirable dc voltage components, to the output of the photoelectron multiplier 20. The output of the amplitude discriminator 36 is connected on the one hand via a gate circuit 37 to the counting input of the reference counter 38 and on the other hand to the control input of the gate 31. The control input of the gate circuit 37 is connected to an output 26a of the driving circuit 26. Thus, the reference counter 38 counts the output pulses of the photoelectron multiplier 20 whose amplitude exceeds the discriminator threshold of the amplitude discriminator 36 and are allowed to pass by the gate circuit 37. The discriminator threshold of the amplitude discriminator 36 is adjustable with the aid of a threshold value generator 44. This discriminator threshold is referred to as reference threshold value $S_R$.

The gate circuit 37 is usually closed and is opened momentarily by pulses which are furnished by the output 26a of the drive circuit 26. The gate circuit 31 is normally open and is closed momentarily by each output pulse of the amplitude discriminator 36.

The stage output of the reference counter 38 are connected to the inputs of a register 48. A further output 26b of the drive circuit 26 is connected to a reset input of the reference counter 38 and to a trigger input of the register 48. When the output 26b of the drive circuit 26 emits a pulse the count of the reference counter 38 is transferred to the register 48 and at the same time the reference counter 38 is reset to zero. The same pulse can also be applied to the reset input of the measuring counter 32 should the latter have the same counting period as the reference counter 38.

If it is assumed that the pulses illustrated in FIG. 2 are the reference pulses furnished by the photoelectron multiplier 20 the reference threshold value $S_R$ is set by the threshold value generator 44 so that it lies in the modulation interval between the maximum pulse amplitude $I_{max}$ and the minimum pulse amplitude $I_{min}$ of the sawtooth-modulated pulses. This reference threshold value $S_R$ is very much higher than the discriminator threshold of the amplitude discriminator 30; it may for example be 4 V. As apparent from FIG. 2 in each modulation period $T_M$ a certain number of pulses then exceeds the reference value threshold $S_R$ whilst the remaining pulses remain below the reference threshold value. The reference counter 38 counts only those reference pulses whose amplitude exceeds the reference threshold value $S_R$. The drive circuit 26 furnishes at the end of each modulation period $T_M$ at the output 26b a pulse which initiates the transfer of the count of the reference counter 38 to the register 48 and resets the reference counter 38 to zero so that in the next modulating period it starts counting again from the beginning. At the end of each modulation period in the register 48 there is therefore a number which indicates the number of reference pulses which in this modulation period exceeded the reference threshold value $S_R$. This number is a criterion for whether the plastic scintillation detector 10 is operating unchanged. For if the light flashes generated by gamma radiation due to a clouding or other change of the plastic scintillator 14 are weakened or if the amplification of the photoelectron multiplier 20 drops, these phenomena act in the same manner also on the light pulses generated by the light-emitting diode 24. As a result, the number of reference pulses exceeding the reference threshold value $S_R$ becomes smaller and consequently at the end of each modulation period $T_M$ a smaller number is in the register 48. This effect can be used to stabilize the plastic scintillation detector 10.

In the example of the embodiment illustrated in FIG. 3 the stabilization of the plastic scintillation detector 10 is by regulating the amplification of the photoelectron multiplier 20 with the aid of a closed loop control circuit containing the monitoring circuit 28 in such a manner that the number introduced at the end of each modulation period $T_M$ into the register 48 is kept to a constant value. For this purpose the output of the register 48 is connected to a voltage regulator 50 which acts on the high-voltage generator 52 of the photoelectron multiplier. If the number introduced into the register 48 drops below the predetermined desired value the voltage regulator 50 increases the high voltage of the photoelectron multiplier 20 until the number of reference pulses counted in each modulation period again reaches the desired value. The reference pulses then again have the prescribed amplitude with respect to the reference threshold value $S_R$. The aging phenomena of the plastic scintillator 14 and/or the photoelectron multiplier 20 are then compensated by an increased amplification of the photoelectron multiplier 20. This compensation acts in the same manner on the scintillation pulses so that the measurement result furnished by the evaluation circuit 22 is also corrected.

If the voltage regulator 50 is a digital voltage regulator it can directly process the digital output signal of the register 48. When using an analog voltage regulator a suitable digital-analog converter is inserted between the register 48 and the voltage regulator 50.

Instead of acting on the high voltage of the photoelectron multiplier 20 the amplification control can also be effected in another manner, for example by changing the gain of an amplifier following the photoelectron multiplier 20 or by varying one or more of the voltage divider resistors of the photoelectron multiplier.

To ensure that the previously described stabilization of the plastic scintillation detector with the aid of the monitoring circuit 28 functions correctly, it is important that the reference counter 38 only responds to reference pulses originating from the light pulses of the light-emitting diode 24 but not to the scintillation pulses generated by the gamma radiation or to interference pulses generated in particular by cosmic radiation.

Various criteria may be utilized to distinguish the reference pulses from the scintillation pulses and from interference pulses. A first criterion is the pulse amplitude. If the intensity of the light pulses emitted by the light-emitting diode 24 is made large enough to be always above the intensity of the light flashes generated in the plastic scintillator 14, the reference threshold value $S_R$ of the amplitude discriminator 36 may be made so high that all the scintillation pulses are suppressed by the amplitude discriminator 36. However, this possibility of distinguishing is subject to considerable restrictions because the amplitudes of the scintillation pulses fluctuate over a wide range. Furthermore, interference pulses whose amplitude exceeds the reference threshold value may occur.

A further criterion for distinguishing the reference pulses from the scintillation pulses and from interference pulses is the different pulse duration. As already mentioned, the duration of the scintillation pulses is of the order of magnitude of 10 ns and the interference pulses which occur, in particular those of large amplitude, have a similarly short duration. When the duration of the pulses emitted by the light-emitting diode 24 is made longer by some orders of magnitude, for example 200 ns, it is possible to distinguish the reference pulses from the scintillation pulses and from interference pulses by the different pulse duration. For this purpose the reference counter 38 may be preceded by a pulse duration discriminator. However, a simpler solution is to use for the reference counter 38 a counter whose response time is so long that although it responds to the reference pulses it does not respond to the short scintillation pulses and interference pulses. This condition is fulfilled in particular by CMOS counters.

Finally, it is also possible to select the reference pulses on the basis of the fact that the instants of their occurrence are exactly known. This fact is utilized in the arrangement of FIG. 3 with the aid of the gate circuit 37. The drive circuit 26 furnishes at the output 26a a pulse whenever the light-emitting diode 24 is stimulated to emit a light pulse. By each of these pulses the gate circuit 37 is opened for the period of time in which a reference pulse can be received. In the pauses between the reference pulses the gate circuit 37 remains closed so that scintillation pulses and interference pulses, even if they are transmitted by the amplitude discriminator 36, cannot reach the reference counter 38.

It no special precautions are taken, apart from the scintillation pulses all the reference pulses and interference pulses will be counted by the measuring counter 32 in the evaluation circuit 22. The counting of the reference pulses would not be detrimental because their number is exactly known and can be taken into account in calculating the filling level from the count of the counter 32. However, this does not apply to the interference pulses, which occur irregularly. To prevent such interference pulses from being counted in the measuring counter 32 in the example of embodiment of FIG. 3, between the amplitude discriminator 30 and the measuring counter 32 the gate circuit 31 is inserted which is blocked by each output pulse of the amplitude discriminator 36 so that the transfer of the corresponding pulse from the output of the amplitude discriminator 30 to the measuring counter 32 is prevented. This prevents the counting of all the pulses whose amplitude exceeds the reference threshold value $S_R$ in the measuring counter 32. These are essentially all pulses generated by cosmic radiation and some of the reference pulses. On the other hand, those reference pulses whose amplitude does not reach the reference threshold value $S_R$ are counted in the measuring counter 32. However, because of the control effected in the example of the embodiment of FIG. 3 the number of these counted reference pulses is always kept to the same constant value so that the count furnished by the counter 32 in each counting period can be correspondingly corrected.

Figure 4:
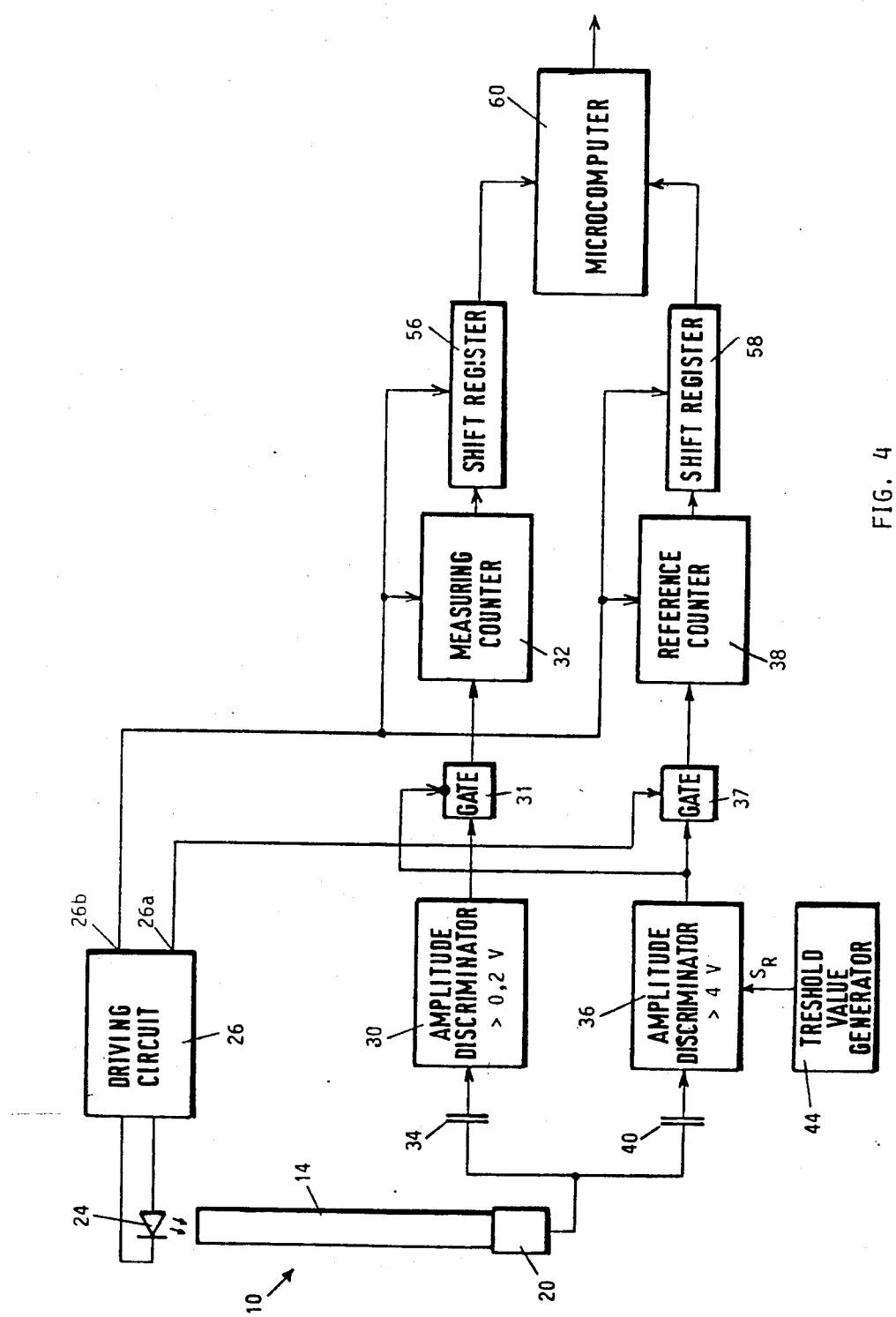
FIG. 4 shows the block circuit diagram of a second embodiment of the evaluation circuit and the monitoring circuit of FIG. 1.

Instead of using the measurement result obtained by counting the reference pulses in the monitoring circuit 28 for controlling the amplification of the photoelectron multiplier as in the example of embodiment of FIG. 3 it is also possible to use this result directly for correction of the measurement result furnished by the evaluation circuit 22. This possibility is available particularly when the measurement result, i.e. the filling level in the container 12, is calculated from the count of the measuring counter 32 by a microcomputer. FIG. 4 shows a modification of the arrangement of FIG. 3 in which use is made of this possibility.

The components of the arrangement of FIG. 4 correspond to those of the arrangement of FIG. 3 up to the outputs of the measuring counter 32 and of the reference counter 38. These identical circuit components have the same functions as in the case of FIG. 3 and therefore will not be described again. However, the control circuit with the voltage regulator 50 is not present. The measuring counter 32 and the reference counter 38 are each followed by a shift register 56 and 58, respectively, into which at the end of each modulation period the count of the associated counter is transferred in parallel due to the pulse furnished by the output 26b of the drive circuit 26 whilst simultaneously the counter is reset to zero. Finally, the contents of the two shift registers 56 and 58 are serially input into a microcomputer 60 which calculates therefrom the filling level of the container 12 and also carries out the correction of the measured values by the count of the reference counter.

In this embodiment no compensation is made of the aging phenomena of the plastic scintillator 14 and/or the photoelectron multiplier 20 which lead to a reduction of the pulse rate of the counted scintillation pulses. However, due to the amplitude modulation of the reference pulses the number of reference pulses counted in each modulation period in reduced in the same proportion and this fact can be utilized in the microcomputer 60 for correcting the measurement result. The modulation in accordance with a linear sawtooth function is particularly advantageous in this case because as a result the pulse number is directly proportional to the reduction of the pulse amplitude.

However, it is by no means essential to conduct a linear sawtooth modulation. The amplitude modulation of the reference pulses may also be by a non-linear function. This may for example be favourable if in the amplification control illustrated in FIG. 3 a particularly high sensitivity is desired in the vicinity of the desired value defined by the reference threshold value $S_R$.

Figure 5:
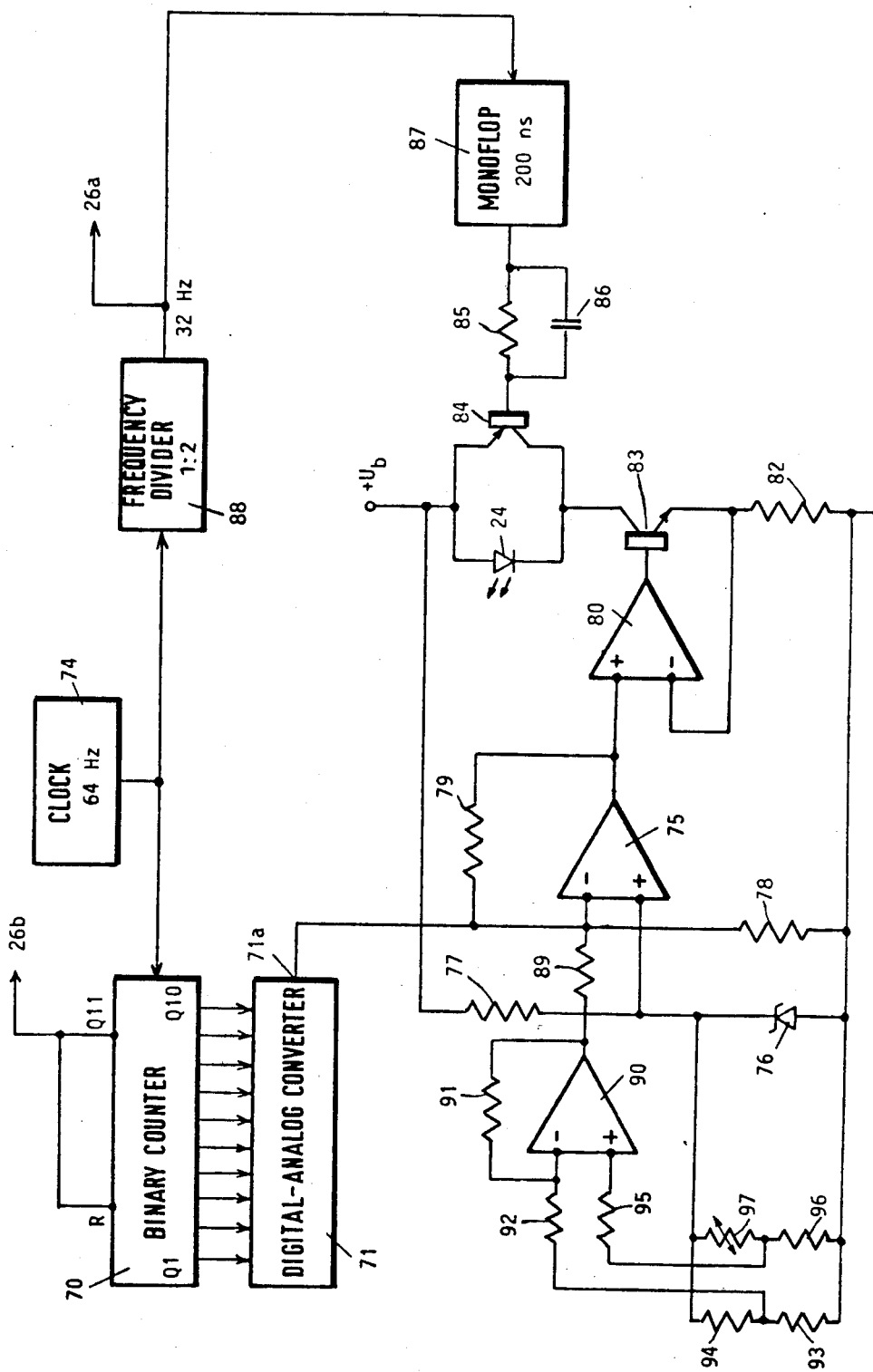
FIG. 5 is the circuit diagram of an embodiment of the driving circuit of FIGS. 1, 3 and 4.

FIG. 5 shows an example of an embodiment of the driving circuit 26 for the case of a linear sawtooth modulation, the sawtooth voltage being generated digitally. Furthermore, the driving circuit fo FIG. 5 effects compensation of the temperature dependence of the light-emitting diode 24.

To generate the sawtooth voltage a binary counter 70 is used in conjunction with a digital-analog converter 71. The binary counter 70 has a capacity $2^{10}=1024$, for which purpose 10 binary counter stages are necessary. For example, it is assumed that a binary counter with a greater stage number is used, for example a 12-stage CMOS counter of the type CD 4040 in which the output Q11 of the 11th stage is connected to the reset input R so that the binary counter is reset to zero whenever the count 1024 is reached and starts counting again from the beginning. The output Q11 may form at the same time the output 26b of the drive circuit. The stage outputs Q1 ... Q10 of the first ten counter stages are connected to the corresponding inputs of the digital-analog converter 71 which furnishes at its output 71a a voltage which is proportional at any instant to the count of the binary counter 70.

The clock input ot the binary counter 70 is connected to the output of a clock 74 which furnishes clock pulses with a recurrence frequency of 64 Hz. The count period of the binary counter 70 is thus $1024/64 = 16$ s.

The output 71a of the digital-analog converter 71 a staircase voltage thus appears which after every 16 s returns to zero and in each period of 16 s has 1024 steps of the same magnitude. This voltage can thus be considered approximately identical to a sawtooth voltage rising linearly with high accurancy.

The output 71a of the digital-analog converter 71 is connected to the inverting input of an operational amplifier 75 which is grounded via resistor 78. The non-inverting input of the operational amplifier 75 receives the voltage drop at a zener diode 76 which is connected in series with a resistor 77 between the positive supply voltage terminal $+U_b$ and ground. In the feedback circuit of the operational amplifier 75 there is a resistor 79. The output voltage of the operational amplifier 75 is applied to the non-inverting input of a further operational amplifier 80 whose output is connected to the base of an npn transistor 83. The emitter of the transistor 83 and the inverting input of the operational amplifier 80 are connected together and via a resistor 82 defining the current to ground. The operational amplifier 80 forms together with the transistor 83 and the resistor 82 a voltage-controlled current source of known type.

The light-emitting diode 24 is in parallel with the emitter-collector path of a pnp switching transistor 84 in the load circuit of the voltage-controlled current source between the voltage terminal $U_b$ and the collector of the transistor 83. The base of the transistor 84 is connected via a resistor 85, with which a capacitor 86 is connected in parallel, to the output of a monoflop 87. A frequency divider 88 connected to the output of the clock 74 and having a division ratio 1:2 supplies pulses with a recurrence frequency of 32 Hz to the triggering input of a monoflop 87. The switching transistor 84 is normally opened. When the monoflop 87 is triggered by a pulse of the frequency divider 88 it furnishes at the output a pulse of 200 ns which blocks the transistor 84 for this period. The output of the frequency divider 88 can form at the same time the output 26a of the driving circuit.

The circuit described above has the following mode of operation:

The operational amplifier 75 operates as differential amplifier furnishing at the output a voltage corresponding to the difference between the terminal voltage of the zener diode 76 and the sawtooth output voltage of the digital-analog converter 71 with a gain depending on the internal resistance of the digital-analog converter 71 and the feedback resistor 79. This output voltage, which is applied to the non-inverting input of the operational amplifier 80, thus consists of a dc voltage with superimposed sawtooth curve and exhibits the time variation of the envelope curve of the pulses of FIG. 2. In this voltage the terminal voltage of the zener diode 76 (for example 5V) defines the start of each sawtooth.

The voltage-controlled current source consisting of the operational amplifier 80, the transistor 83 and the resistor 82 produces in the circuit extending from voltage terminal +$U_b$ via the normally conductive switching transistor 84, the transistor 83 and the resistor 82 to ground a current exactly proportional to the output voltage of the operational amplifier 75. When the switching transistor 84 is conductive the light-emitting diode 24 is practically short-circuited so that it does not carry any current. Following each pulse furnished by the frequency divider 88 the switching transistor 84 is blocked so that the current produced by the voltage-controlled current source must flow via the light-emitting diode 24. The light-emitting diode 24 thus furnishes light pulses with a duration of 200 ns and a recurrence period of 32 Hz. Since the intensity of the light emitted by a light-emitting diode is proportional to the current flowing through the diode the intensity of the light pulses emitted by the light-emitting diode 24 varies as a function of the time in proportion to the voltage applied to the input of the operational amplifier 80. The intensity of the light pulses thus varies in accordance with the diagram of FIG. 2.

Of course, the intensity of the light emitted by a light-emitting diode depends not only on the current flowing through the diode but also on the temperature. In the drive circuit of FIG. 5 additional measures are taken to compensate this temperature dependence of the light-emitting diode 24.

Applied to the non-inverting input of the operational amplifier 75 via a resistor 89 is the output voltage of a further operational amplifier 90 in the feedback circuit of which is a resistor 91. The inverting input of the operational amplifier 90 is connected via a resistor 92 to the tap of a voltage divider which consists of two fixed resistors 93, 94 and is connected in parallel to the zener diode 76. Thus, at the inverting input of the operational amplifier 90 there is a fixed fraction, defined by the voltage divider ratio, of the voltage stabilized by the zener diode 76. The non-inverting input of the operational amplifier 90 is connected via a resistor 95 to the tap of a voltage divider which is also connected parallel to the zener diode 76. This voltage divider consists of a fixed resistor 96 and an temperature-dependent resistor 97, for example of type PT100. The operational amplifier 90 thus furnishes a voltage which depends on the ambient temperature. This voltage is superimposed by the operational amplifier 75 on the previously explained sawtooth modulation voltage. The voltage divider ratios of the voltage dividers 93, 94 and 96, 97 and the gain of the operation amplifier 90 are so dimensioned that this temperature-dependent voltage influences the current flowing through the light-emitting diode 24 in such a manner that the temperature dependence of the light-emitting diode 24 is just compensated.

Figure 6:
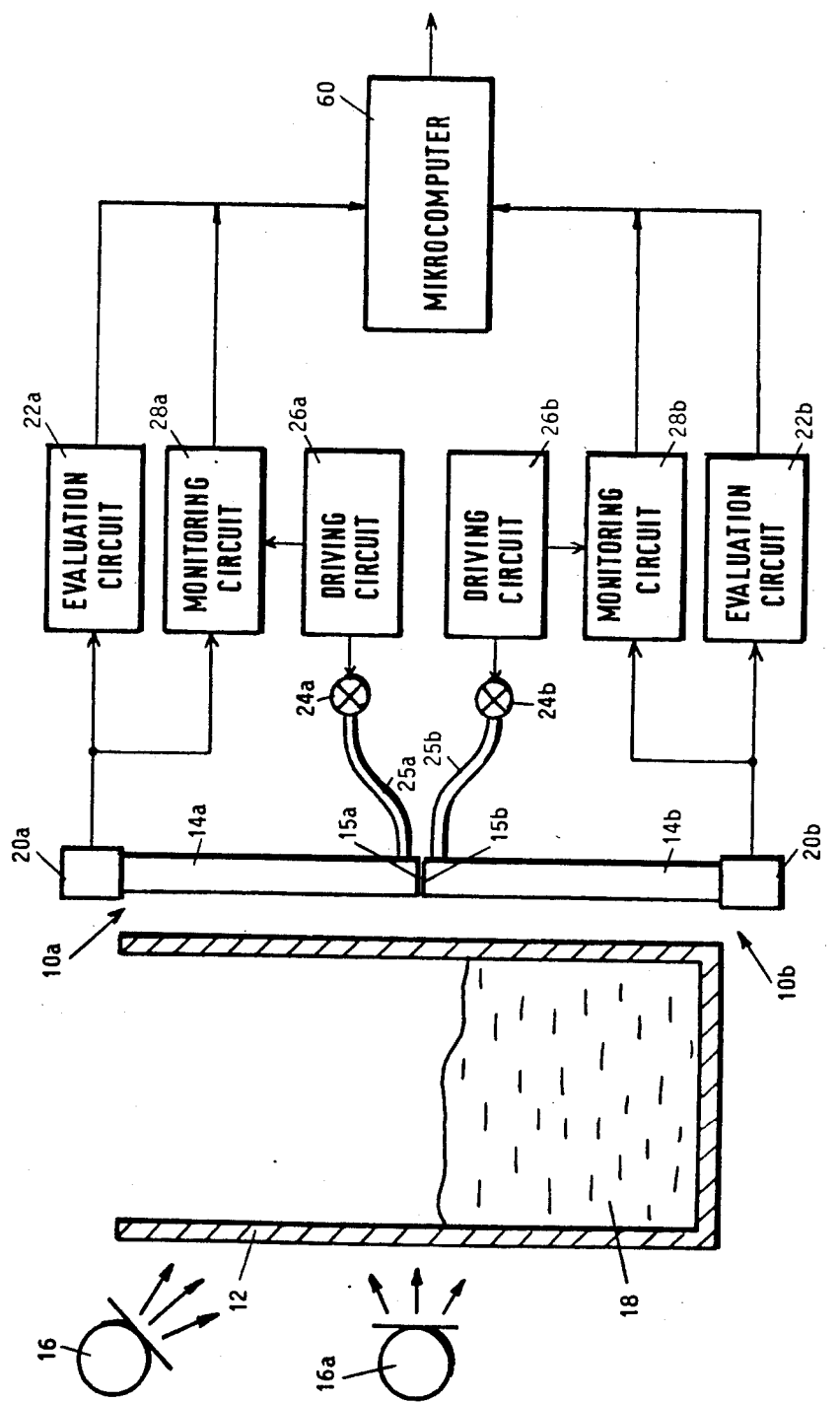
FIG. 6 is a schematic illustration of a modified embodiment of the filling level measuring arrangement.

If a single plastic scintillator of correspondingly great length is used to monitor a space which is very long, for example in measuring the filling level of high containers, both the scintillation light flashes which are generated at the end of the scintillator remote from the photoelectron multiplier and the light pulses used for the stabilization are greatly weakened on passage through the long scintillator before they are incident on the photoelectron multiplier. FIG. 6 shows a modified embodiment of the level measuring arrangement of FIG. 1 in which this disadvantage is obviated by using two plastic scintillation detectors 10a and 10b, each consisting of a plastic scintillator 14a and 14b respectively and a photoelectron multiplier 20a and 20b respectively. The plastic scintillators 14a, 14b are coaxial with each other so that their end faces 15a, 15b opposite the photoelectron multiplier 20a or 20b face each other and lie the smallest possible distance apart from each other or are even in contact. To prevent light passing from the one plastic scintillator to the other the two opposed end faces 15a, 15b are metallized. Associated with each plastic scintillation detector 10a, 10b is its own evaluation circuit 22a, 22b, its own monitoring circuit 28a, 28b, its own reference light source 24a, 24b and an associated driving circuit 26a, 26b. It is assumed in FIG. 6 that the output signals of the monitoring circuits 28a, 28b are used to correct the measurement results supplied by the evaluation circuits 22a, 22b as in the case of FIG. 4. For this purpose the output signals of the evaluation circuits 22a, 22b and the monitoring circuits 28a, 28b are processed by a common microcomputer 60. The use illustrated in FIG. 6 of two plastic scintillation detectors 10a, 10b can however also be realized if according to the example of embodiment of FIG. 3 the stabilization is by amplification regulation. In this case, which is not illustrated in the drawings, the output of the monitoring circuit 28a acts via an associated control circuit on the amplification of the photoelectron multiplier 20a and the output of the monitoring circuit 28b acts via a second control circuit on the amplification of the photoelectron multiplier 20b.

The evaluation circuits 22a, 22b and the monitoring circuits 28a, 28b may be constructed in the manner explained above with reference to FIG. 3 and 4.

It is also possible to arrange a plurality of gamma radiation sources at various levels at the container. As example, in FIG. 6 an additional gamma radiation source 16a is disposed half way up.

To avoid a dead space arising for the level measurement it is desirable for the end faces 15a, 15b of the plastic scintillators 14a, 14b to be arranged the smallest possible distance apart. It would therefore be unfavourable to arrange the reference light source 24a, 24b, for example light-emitting diodes, as in the case of FIG. 1 directly at these end faces. To avoid doing so, in the arrangement of FIG. 6 the light pulses generated by the reference light sources 24a, 24b are transmitted via light guides 25a, 25b respectively to the plastic scintillators.

Figure 8:
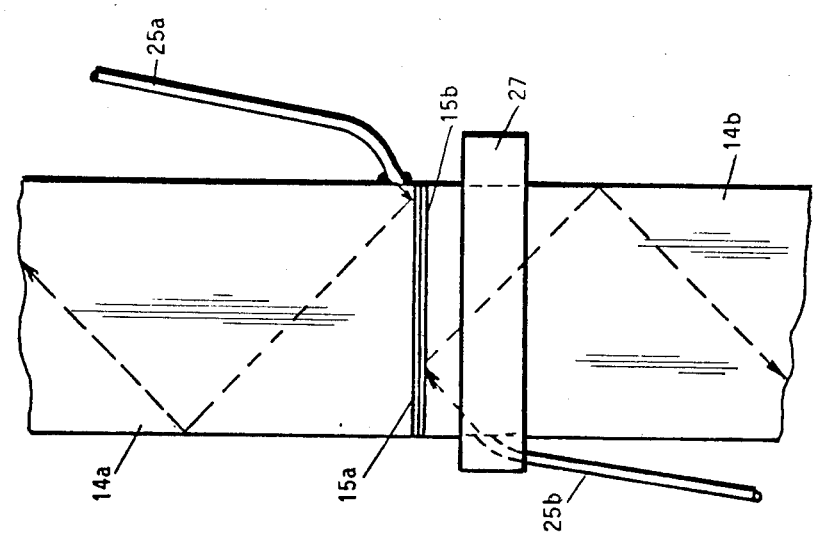
FIG. 8 shows other examples of connection of the light guides to the plastic scintillators in the filling level measuring arrangement of FIG. 6.
Figure 7:
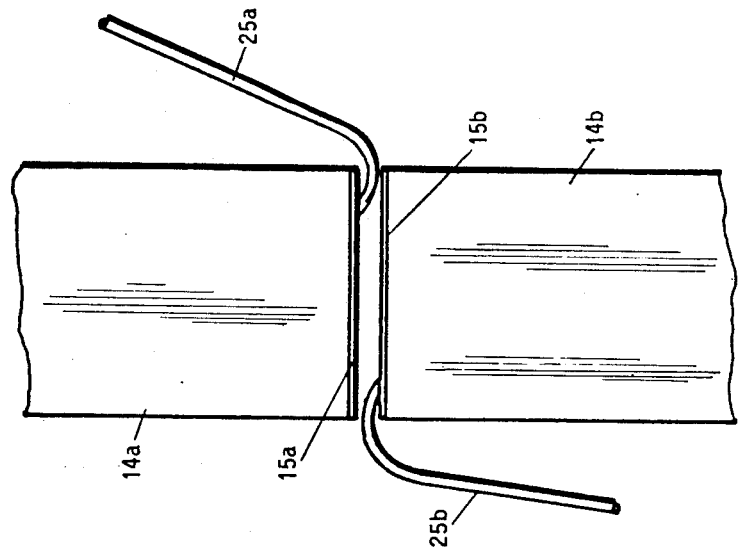
FIG. 7 is an example of the connection of the light guides to the plastic scintillators in the filling level measuring arrangement in FIG. 6

In FIGS. 7 and 8 various possibilities for the connection of the light guides 25a, 25b to the plastic scintillators 14a, 14b are illustrated.

In the embodiment of FIG. 7 the ends of the light guides 25a, 25b are affixed by means of an adhesive to the metallized end faces 15a, 15b of the plastic scintillators 14a, 14b so that the reference light pulses are coupled from the end face axially into the plastic scintillators. However, with this arragement a dead volume is still formed between the two plastic scintillators, although it is very small.

As FIG. 8 shows it is also possible to couple the light pulses from the side faces into the plastic scintillators. The metallized end face 15a, 15b can then bear directly on each other so that the dead volume is restricted to the thickness of the two metallizations, which is very small (e.g. 20 μm).

For the connection of the two light guides to the side faces of the plastic scintillators in FIG. 8 two examples are shown which can be optionally employed. The light guide 25a is affixed to the side face of the plastic scintillator 14a by means of an adhesive whilst the light guide 25b secured by means of a plastic dip 27 in such a manner that its end face is pressed against the side face of the plastic scintillator 14b.

In both cases the light pulses coupled from the light guides 25a, 25b into the plastic scintillators 14a, 14b are transmitted by reflection at the metallized end faces 15a, 15b and by total reflections at the side faces of the plastic scintillators 14a, 14b to the photoelectron multipliers disposed at the opposite ends.

The stabilization by means of amplitude-modulated reference light pulses has been described already with the aid of the example of plastic scintillation detectors, for which it is particularly advantageous because in this manner the aging phenomena or other modifications of the plastic scintillators influencing the light transmission are also stabilized. However, it is obvious that this manner of stabilization can also be applied to other types of scintillisation detectors, for example to crystal or liquid scintillization detectors.

We claim:

1. A method of stabilizing a scintillation detector having a photoelectric transducer for generator output pulses when stimulated by radiation comprising the steps of generating periodic light pulses with a predetermined recurrence period, modulating the intensity of successive light pulses in a modulation interval extending between a minimum intensity and a maximum intensity in accordance with a periodic sawtooth function having a modulation period which is large compared with the recurrence period of the light pulses, superimposing said modulated light pulses on radiation to be measured so that said light pulses are intercepted by the photoelectric transducer of said scintillation detector and converted into periodic electrical reference pulses having the same recurrence period as said light pulses, said reference pulses being pulse amplitude modulated in accordance with said sawtooth function in the modulation interval, determining in each modulation period the number of reference pulses whose amplitudes exceed a predetermined reference threshold value lying in said modulation interval, and using said number for stabilizing said scintillation detector.

2. The method according to claim 1, wherein the scintillation detector includes a scintillator, and further comprising the step of transmitting the modulated light pulses through the scintillator to the photoelectric transducer.

3. The method according to claim 1 and further comprising the step of amplifying the output pulses of the photoelectric transducer and controlling the amplification of the output pulses of the photoelectric transducer to maintain a predetermined number of reference pulses whose amplitude exceeds the predetermined reference threshold value.

4. The method of claim 3 wherein the step of controlling the amplification of the output pulses of the photoelectric transducer comprises controlling the amplification of the output pulses based upon the number of reference pulses which exceed the predetermined reference threshold value in said modulation interval.

5. The method according to claim 1 wherein the determined number of reference pulses is used for correction of a measurement result of the scintillation detector.

6. In a scintillation detector comprising a radiation source, a scintillator in which light flashes are generated by ionizing radiation coming from the radiation source, aphotoelectric transducer which is arranged so that it receives the light flashes generated in the scintillator and converts them to electrical output signals, an evaluation circuit connected to the output of the photoelectric transducer for evaluating the output signals of the photoelectric transducer produced by the light flashes, a pulsewise operated light source which is arranged in such a manner that the light pulses generated thereby are intercepted by the photoelectric transducer, the photoelectric transducer producing reference pulse output signals in response to stimulation by the light source's light pulses, and a monitoring circuit which is connected to the output of the photoelectric transducer and responds to the reference pulse output signals of the photoelectric transducer, the improvement comprising driving circuit means for driving the light source including means for varying the intensity of the light pulses in accordance with a predetermined periodic function during a modulation interval extending between a mininum intensity light pulse and maximum intensity light pulse, and wherein the monitoring circuit includes reference counter means for counting the reference pulses during the modulation interval whose amplitudes exceed a predetermined reference threshold value lying in the modulation interval.

7. The improvement according to claim 6 wherein the monitoring circuit further includes amplitude discriminator means coupled to the reference counter means for passing through to the counter means only pulses having an amplitude exceeding the reference threshold value.

8. The improvement according to claim 6 wherein the driving circuit means includes means for activating the monitoring circuit only during the transmission of each light pulse.

9. The improvement according to claim 8 wherein the monitoring circuit further includes amplitude discriminator means coupled to the reference counter means for passing through to the counter means only pulses having an amplitude exceeding the reference threshold value and the activating means includes a gate circuit between the amplitude discriminator means and the reference counter means which is opened by the driving circuit means only during the transmission of each light pulse.

10. The improvement according to claim 6 wherein the duration of the light pulses is greater than the duration of the scintillation light flashes and the monitoring circuit includes a pulse duration discriminator.

11. The improvement according to claim 10 wherein the reference counter means has a response time which is so long that it responds to pulses with the duration of the light pulses but not to pulses with the duration of the scintillation light flashes.

12. The improvement according to claim 11 wherein the reference counter means is a CMOS counter.

13. The improvement according to claim 6 wherein the evaluation circuit includes means for suppressing interference pulses.

14. The improvement according to claim 6 wherein the driving circuit means includes sawtooth generator means for modulating the intensity of the light pulses.

15. The improvement according to claim 14 wherein the sawtooth generator means is formed by a counter driven by a clock and a digital-analog converter.

16. The improvement according to claim 6 wherein the light source is a light-emitting diode.

17. The improvement according to claim 16, further comprising a switch which is closed for the transmission of each light pulse and is connected in parallel with the light-emitting diode.

18. The improvement according to claim 16 wherein the drive circuit means includes temperature-dependent circuit means for compensating the temperature dependence of the light-emitting diode.

19. The improvement according to claim 18 wherein the scintillator comprises two scintillators and the photoelectric transducer comprises two photoelectric transducers, each scintillator being metallized at its opposing end faces, the opposite end faces being connected to one of the photoelectric transducers, and light guide means at the end of each scintillator for transmitting the modulated light pulses into each scintillator at a point remote from the photoelectric transducer associated with that scintillator.

20. The improvement according to claim 6 wherein the monitoring circuit includes means for producing at an output an output signal corresponding to the determined number of pulses, means for coupling the monitoring circuit's output to the evaluation circuit and the evaluation circuit includes means for correcting a measurement result of the scintillator based upon the determined number of pulses.

21. A method for automatic stabilization of a scintillation detector having a photoelectric transducer for producing output pulses in response to stimulation by radiation comprising the steps of generating a train of different intensity light pulses during a time interval, detecting the light pulses with the photoelectric transducer to produce a reference pulse for each detected light pulse, the amplitude of the reference pulses indicative of the intensity of the detected light pulses, determining the number of reference pulses whose amplitudes exceeds a reference value during the time interval and using the determined number to stabilize the scintillation detector.

22. The method of claim 21 wherein the intensities of the light pulses in the light pulse train vary throughout a range.

23. The method according to claim 22 and further comprising the steps of amplifying the output pulses of the photoelectric transducer and adjusting the amplification of the output pulses to maintain a relatively constant number of reference pulses whose amplitudes exceed the reference value.

24. The method according to claim 23 wherein the step of adjusting the amplification of the output pulses comprises adjusting the amplification of the output pulses based upon the determined number of reference pulses whose amplitudes exceed the reference value.

25. The method of claim 22 wherein the determined number of reference pulses whose amplitudes exceed the reference value is used to correct a measurement result of the scintillation detector.

26. The method of claim 22 wherein the intensities of the light pulses vary according to a sawtooth function.

27. The method of claim 22 wherein the intensities of the light pulses vary linearly over the range.

* * * * *